(12) United States Patent
Bacchetti

(10) Patent No.: US 12,134,928 B2
(45) Date of Patent: *Nov. 5, 2024

(54) LINEAR ACTUATOR, AS WELL AS CLOSING/OPENING SYSTEM THAT INCLUDES SUCH ACTUATOR

(71) Applicant: IN & TEC S.R.L., Brescia (IT)

(72) Inventor: Luciano Bacchetti, Nave (IT)

(*) Notice: Subject to any disclaimer, the term of this patent is extended or adjusted under 35 U.S.C. 154(b) by 89 days.

This patent is subject to a terminal disclaimer.

(21) Appl. No.: 18/114,268

(22) Filed: Feb. 26, 2023

(65) Prior Publication Data

US 2023/0203870 A1  Jun. 29, 2023

Related U.S. Application Data

(63) Continuation-in-part of application No. 16/480,217, filed as application No. PCT/IB2018/050667 on Feb. 2, 2018, now Pat. No. 11,619,088.

(30) Foreign Application Priority Data

Feb. 2, 2017 (IT) .......................... 102017000011597
Feb. 2, 2017 (IT) .......................... 102017000011628

(51) Int. Cl.
*E05F 15/56* (2015.01)
*E05F 15/50* (2015.01)

(52) U.S. Cl.
CPC .............. *E05F 15/56* (2015.01); *E05F 15/50* (2015.01)

(58) Field of Classification Search
CPC .. E05F 1/16; E05F 15/56; E05F 15/50; E05Y 2201/478
See application file for complete search history.

(56) References Cited

U.S. PATENT DOCUMENTS

| | | | | |
|---|---|---|---|---|
| 5,157,806 A * | 10/1992 | Wartian | ................... | F16F 9/516 16/84 |
| 8,051,534 B1 * | 11/2011 | Luca | ......................... | E05F 3/02 16/84 |
| 8,439,098 B1 * | 5/2013 | Jones | ......................... | E05F 1/16 160/180 |
| 8,601,742 B2 * | 12/2013 | Domholt | ................. | F15B 15/18 49/140 |
| 9,435,152 B2 * | 9/2016 | Zimmer | ................... | E05F 5/003 |
| 11,225,816 B2 * | 1/2022 | Gayhart | ................. | E05F 15/635 |
| 2019/0390496 A1 * | 12/2019 | Bacchetti | ................... | E05F 3/10 |

FOREIGN PATENT DOCUMENTS

| | | | | |
|---|---|---|---|---|
| GB | 820818 A | * | 9/1959 | |
| GB | 2134175 A | * | 8/1984 | ............. E05F 15/50 |

* cited by examiner

*Primary Examiner* — Jeffrey O'Brien
(74) *Attorney, Agent, or Firm* — Themis Law

(57) ABSTRACT

A linear actuator includes a jacket defining an axis, and a rod having an end cylinder tightly slidable within the jacket and an opposite end sliding between a rest position and a working position. The end cylinder divides the jacket into a first and second variable volume compartment fluidically independent from each other, one of the first or second variable volume compartment being fluidically insulated and under vacuum, the other one fluidly communicating with the outside environment. The jacket has an abutment member having a non-return valve mechanism adapted to discharge ambient air that may be entrapped between the end cylinder and the abutment member.

20 Claims, 4 Drawing Sheets

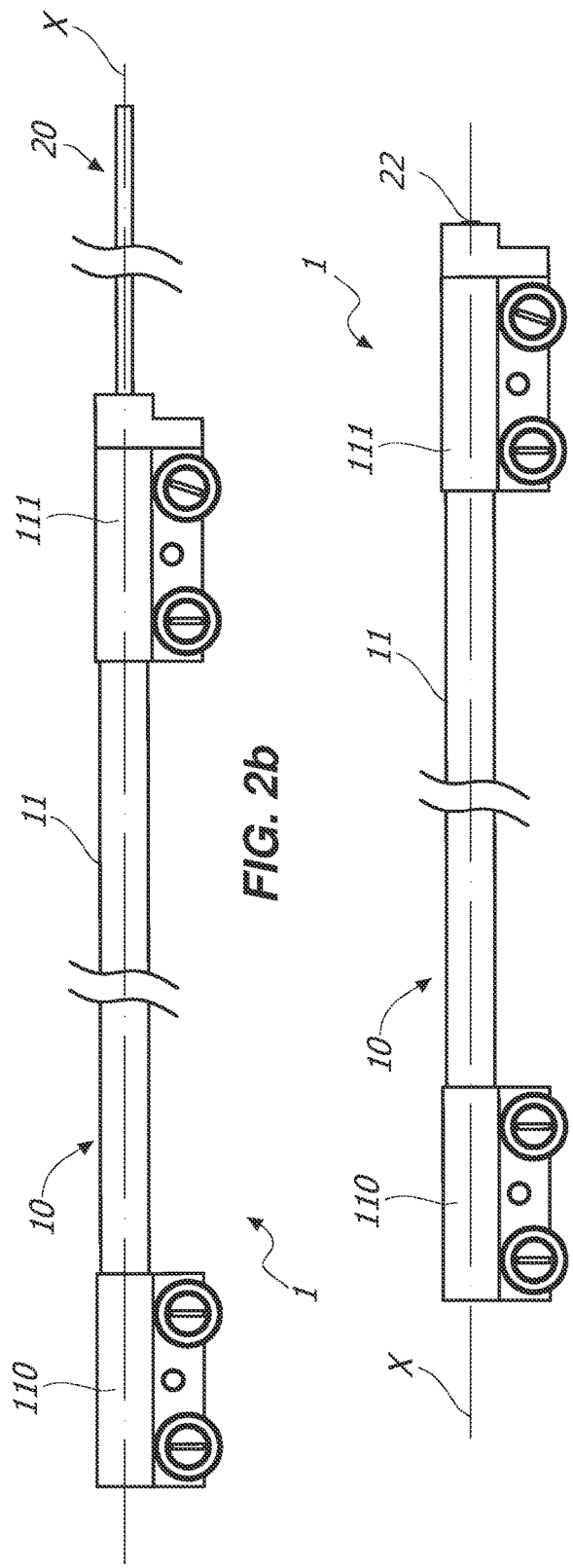
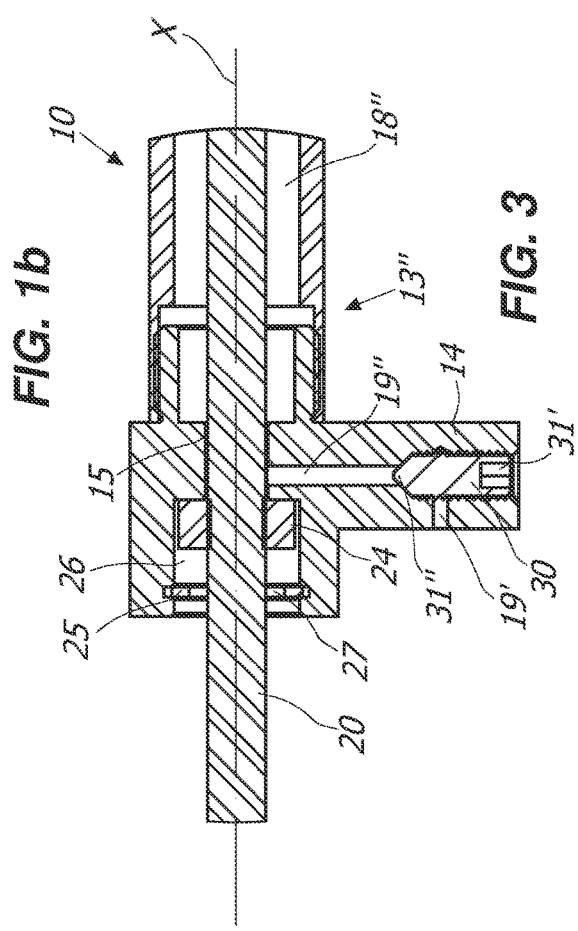

LINEAR ACTUATOR, AS WELL AS CLOSING/OPENING SYSTEM THAT INCLUDES SUCH ACTUATOR

FIELD OF THE INVENTION

The present invention is generally applicable to the technical field of moving systems, and particularly relates to a linear actuator.

The invention further relates to a system for opening/closing an aperture including such an actuator.

BACKGROUND OF THE INVENTION

Main kinds of pneumatic linear actuators are known, for example compression and traction gas springs are known too.

In these kinds of linear actuators a gas, generally nitrogen, is used to bring the rod back to its rest position once it is pushed or pulled into the working position.

A known drawback of these kinds of springs is that they tend to discharge over time, causing them to be periodically replaced. Moreover, since the rod works against a gas as the rod is compressed or pulled, the pressure of the gas increases, and as a result the force necessary to move the rod increases.

On the other side, from GB820818 a linear actuator is known having one of the chambers under vacuum, in such a manner that the returning force of the rod once moved from the rest position in due to the vacuum.

However, a drawback of this known actuator is the fact that they tend to stop over time because of the unavoidable inlet of ambient air into the vacuum chamber.

SUMMARY OF THE INVENTION

The object of the present invention is to overcome at least partially the above drawbacks, by providing a linear actuator having characteristics of high functionality, simplicity of construction and being low cost.

Another object of the invention is to provide a linear actuator having a long duration over time.

Another object of the invention is to provide a linear actuator which always requires the same force to move the rod independently of its position.

Another object of the invention is to provide a linear actuator which requires minimum maintenance.

Another object of the invention is to provide a linear actuator of limited overall dimensions.

Another object of the invention is to provide an actuator which ensures the automatic closing/opening of a door or of a door leaf from the open/closed position.

Another object of the invention is to provide a linear actuator which ensures the controlled movement of the closing element to which it is connected.

Another object of the invention is to provide a linear actuator which has a minimum number of constituent parts.

These objects, as well as other objects which become more apparent hereinafter, are fulfilled by a linear actuator in accordance with what is herein described, illustrated and/or claimed.

BRIEF DESCRIPTION OF THE DRAWINGS

Further features and advantages of the invention will be more evident considering the detailed description of some preferred but not exclusive embodiments of a linear actuator 1, shown by way of a non-limiting example with the aid of the accompanying drawings, wherein:

FIGS. 1b and 2b are schematic views of the embodiment of the linear actuator 1 of FIGS. 1a and 2a respectively in the closed and the open position of the door D;

FIG. 3 is a view in section of the end 13" of the tubular element 11 of the embodiment of the linear actuator 1 of FIGS. 1a and 1b;

FIGS. 4b and 5b are views in section of the end 13' of the tubular element 11 of the embodiment of the linear actuator 1 of FIGS. 4a and 5a;

DETAILED DESCRIPTION OF EMBODIMENTS OF THE INVENTION

With reference to the above-mentioned figures, a linear actuator 1 is described, adapted to linearly move any object, mechanism or system. The linear actuator can act directly or indirectly, by means of pulleys or like mechanisms.

In a preferred but not exclusive embodiment, the linear actuator 1 can be used in a system 100 for closing/opening an aperture P by means of a closing element D movable between an open position and a closed position.

In general, the aperture P may be any opening made in any stationary supporting structure, and the closing element D may be any such, for example a door, a door leaf, a hatch, a trap-door or similar. Likewise, the closing element D can move with any motion, rectilinear along a sliding plane or rotary around a rotation axis.

Figure 1A:
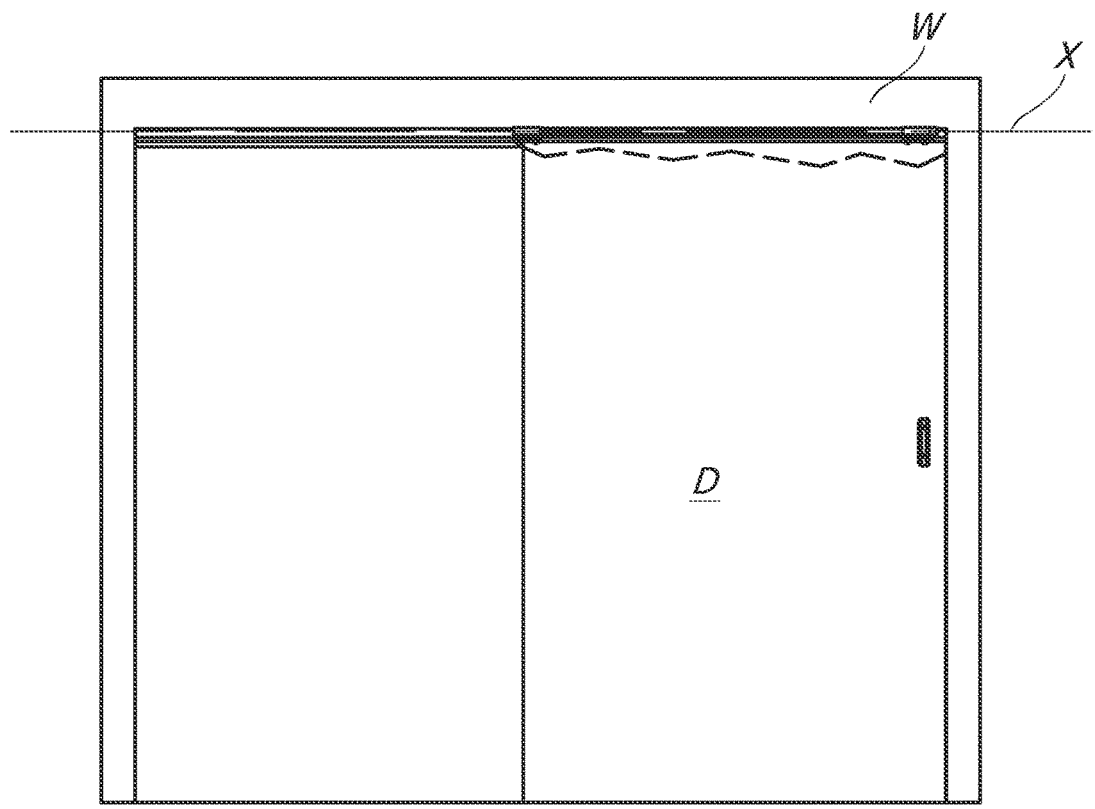
FIGS. 1a and 2a are schematic views of an embodiment of the system 100 for closing an aperture P by means of a sliding door D moved by a preferred non-exclusive embodiment of a linear actuator 1, respectively in the closed and the open position of the door D.
Figure 2A:
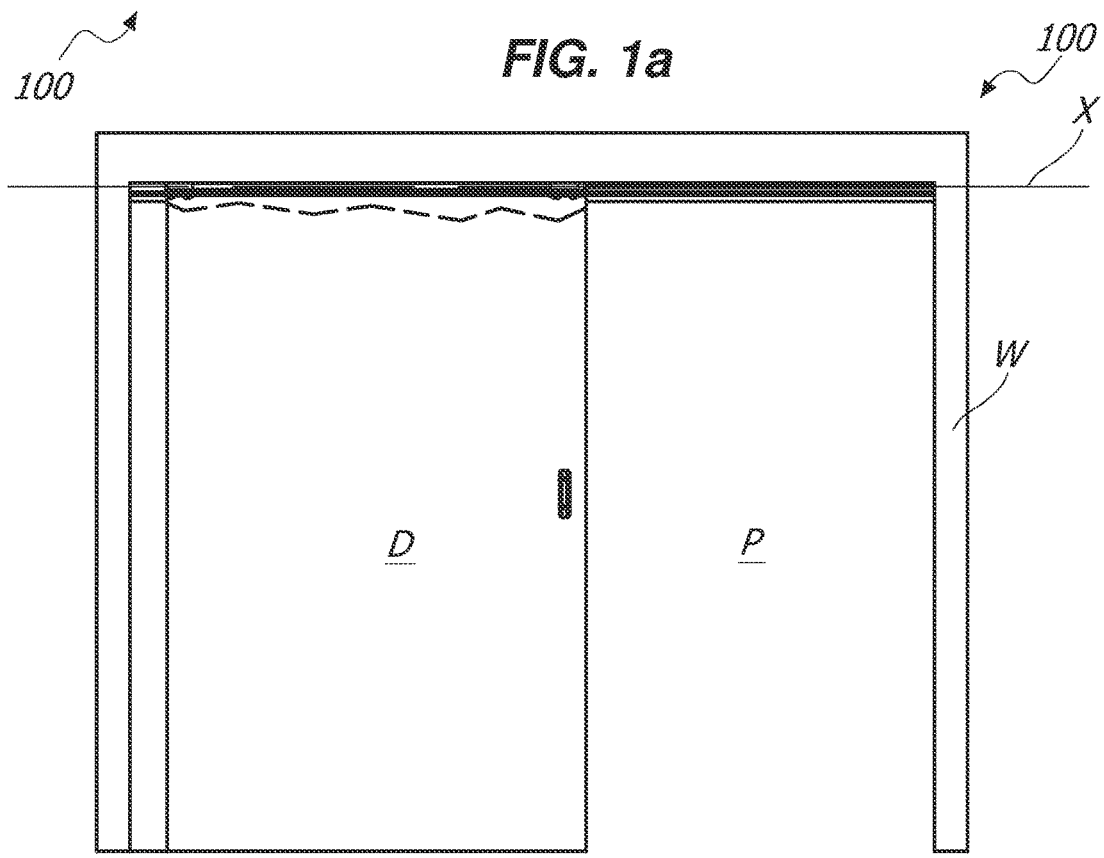

For example, as illustrated in FIGS. 1a and 2a, the aperture P may be a passage made in a wall W, and the closing element D may be a sliding door in a plane defined by the door itself between a closed position, shown in FIG. 1a, and an open position, illustrated in FIG. 2a. FIGS. 1b and 2b respectively show the linear actuator 1 in the positions corresponding to those of FIGS. 1a and 2a.

In general, the linear actuator 1 may comprise a jacket 10 defining an axis X and a rod 20 movable between a retracted position, illustrated for example in FIG. 1b, and an extended position, illustrated for example in FIG. 2b.

Even if, in the following, the jacket 10 is described as a movable element with respect to the stationary rod 20, it is understood that the opposite can also occur, i.e., the rod may move in relation to the stationary jacket, without thereby exceeding the scope of protection of the appended claims.

It is also understood that even if in the illustrated embodiments a single rod 20 and a single jacket 10 are provided, the linear actuator 1 may include a plurality of jackets and/or a plurality of rods, as it can be coupled to other actuators, without thereby exceeding the scope of protection of the appended claims.

In any case, the mobile element of the linear actuator 1, the jacket 10 in the embodiment illustrated in the appended figures, may be connected to the sliding door D, while the stationary element, the rod 20 in the embodiment illustrated in the appended figures, may be fixed to the wall W.

Therefore, the jacket 10 will slide unitary with the door between the open and closed positions thereof.

For this purpose, slider means may be provided, for example two or more slides 110, 111, operatively engaged in one or more guiding rails 120 defining a sliding direction d substantially parallel to the axis X defined by the jacket.

Advantageously, the slides 110, 111 can be couplable to the tubular element 11 of the linear actuator 10, for example slidably inserted thereon.

In this way, a compact, simple to realize and functional linear actuator is obtained.

As mentioned above, in the present description the notion of sliding between the rod 20 and the jacket 10 and the relative parts must be understood in a relative and not absolute manner. Therefore, even if for simplicity the sliding of the rod 20 with respect to the jacket 10 is cited, it must be understood that the sliding between these parts is reciprocal and relative to each other.

Figure 4A:
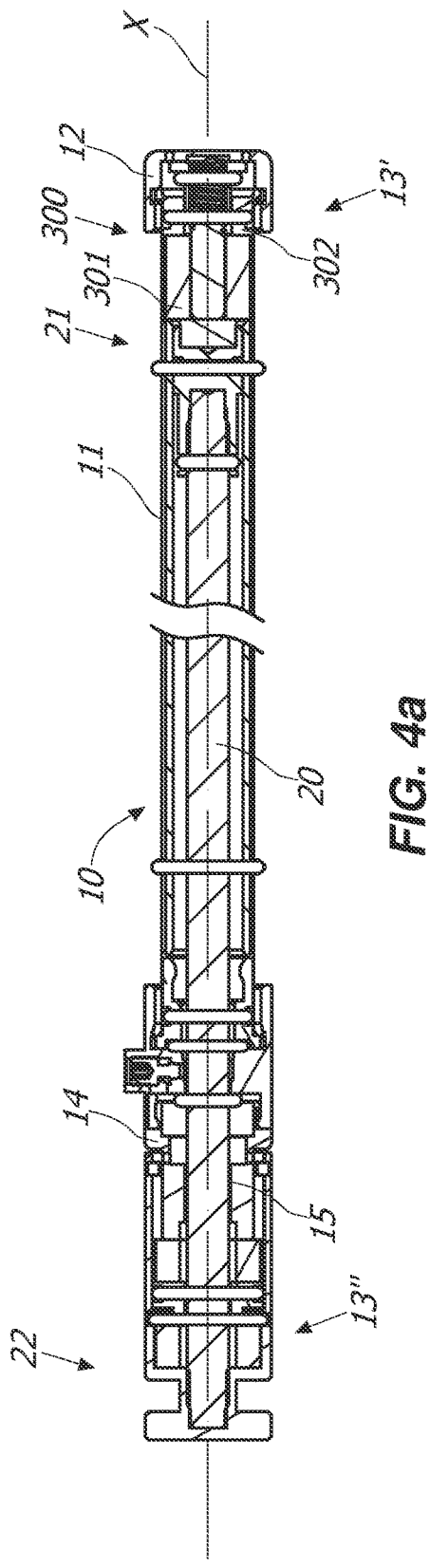
FIGS. 4a and 5a are schematic views of another embodiment of the linear actuator 1 respectively in the closed and the open position of the door D.

In the embodiment illustrated in the annexed figures the retracted position of FIGS. 1b and 4a, corresponding to the closed position of the door D, corresponds to the rest position of the linear actuator 1, i.e., the one in which the linear actuator 1 itself is not stressed by external forces.

Figure 5A:
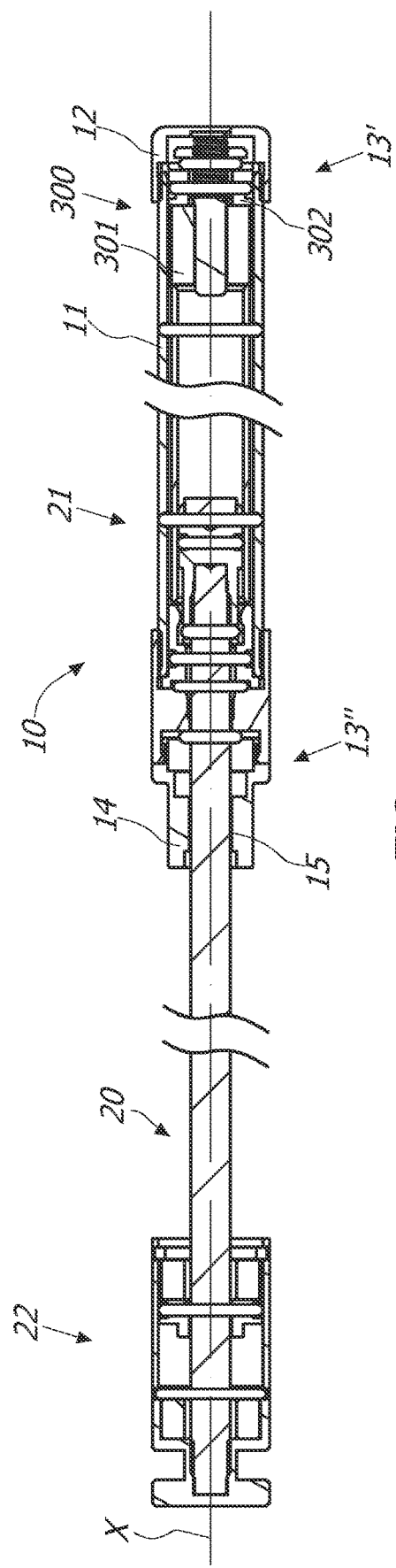
Figure 4B:
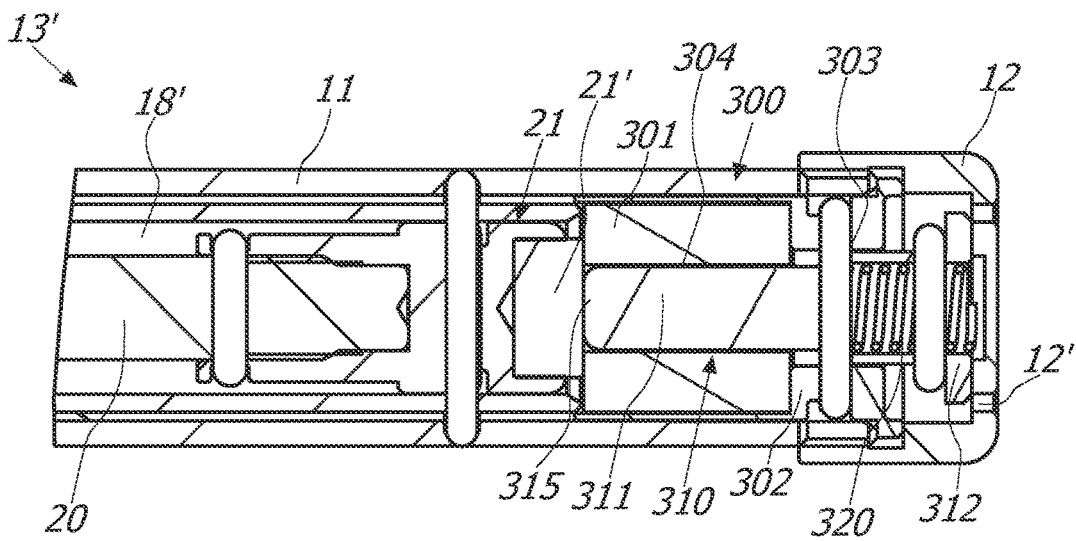

On the other hand, the extended position of FIGS. 2b and 5a, corresponding to the open position of the door D, corresponds to the working position of the linear actuator 1, i.e., the one wherein the linear actuator 1 is stressed by the force that the user gives to the door to open it. From this position the linear actuator 1 automatically closes the door D, or, which is the same, the linear actuator 1 automatically returns to its rest position.

In this embodiment, therefore, the linear actuator 1 works in traction.

Advantageously, the rod 20 may include an end cylinder 21 and an opposite end 22, both unitary slidable with the rod 20 along the axis X. The end cylinder 21, therefore, will slide between the rest and working positions.

The end cylinder 21 may be tightly inserted within the jacket 10. The opposite end 22 may slide outwardly of the jacket 10 between a position proximal to this, corresponding to the rest position shown in FIGS. 1b and 4a, and a distal position thereof, corresponding to the working position shown in FIGS. 2b and 5a.

The jacket 10 may include a tubular element 11 defining the side wall thereof, an end cap 12 screwed at the end 13' of the tubular element 11 and a closing element 14 screwed at the other end 13" of the tubular element 11.

The rod 20 may be inserted through an opening 15 passing through the closing element 14.

The end cylinder 21 may divide the jacket 10 into a first and second variable volume compartments 18', 18" fluidically independent to each other, i.e., compartments which are not fluidically connected to each other and which don't exchange any fluid each other.

When the end 22 is in the rest position, as illustrated for example in FIGS. 1b and 4a, the variable volume compartment 18' has the minimum volume while the variable volume compartment 18" has the maximum volume, while the opposite occurs when the end 22 is in the working position, as illustrated for example in FIGS. 2b and 5a.

The compartment 18' may be fluidically insulated, i.e. any fluid can't normally enter/exit in/from the same, as better explained below.

In fact, as already cited above, the end cylinder 21 may be tightly inserted within the jacket 10. On the other side, the end 13' of the tubular element 11 includes a tubular abutment member 300 adapted to come in contact with the end cylinder 21 when the end 22 is in the rest position, as illustrated for example in FIGS. 1b and 4a.

More in detail, the tubular abutment member 300 is formed of a first front element 301, which is adapted to contact the end cylinder 21, and a second rear element 302, which purpose will be explained below. The first front element 301 and the second rear element 302 are unitary coupled to each other.

Within the tubular abutment member 300 a plug 310 is coaxially inserted. An elastic member 320, e.g., a counteracting spring, is interposed between the end cap 12 and the plug 310 to act thereon.

More in detail, the plug 310 has a front stem-like portion 311 and a rear enlarged portion 312.

Thanks to the elastic member 320 the enlarged portion 312 of the plug 310 is elastically forced against the rear surface 303 of the second rear element 302 of the tubular abutment member 300.

On the other end, the stem-like portion 311 of the plug 310 is inserted with a certain clearance within the first front element 301 of the tubular abutment member 300, so as to define a tubular interspace 304 therebetween.

Advantageously, the length L1 of the plug 310 is greater than the length L2 of the tubular abutment member 300.

Figure 5B:
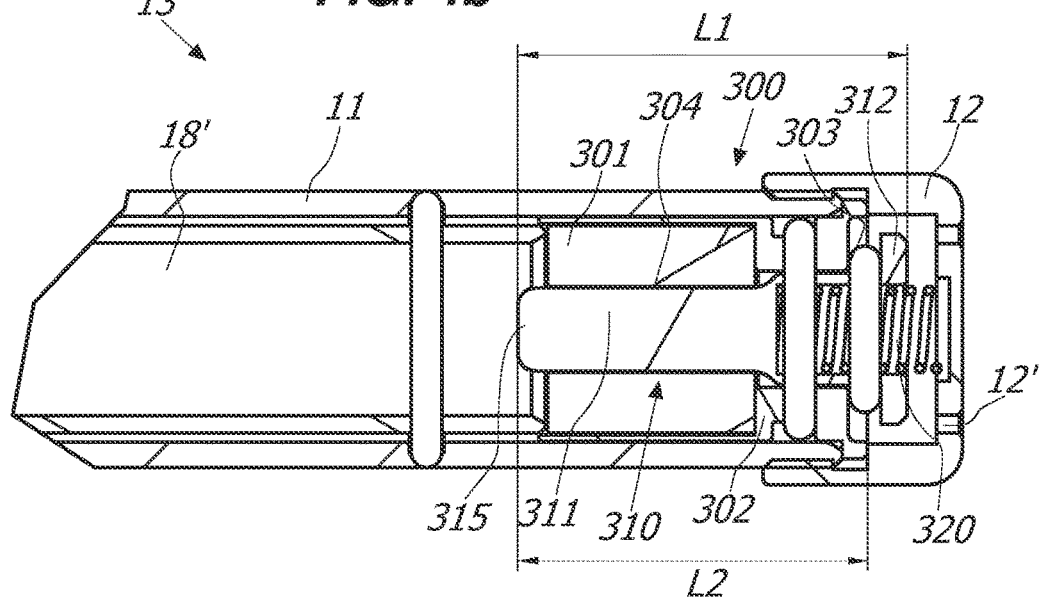

In this manner, when the end cylinder 21 is not in the rest position, i.e., when the end cylinder 21 and the tubular abutment member 300 are spaced apart to each other, the elastic member 320 elastically forces the enlarged portion 312 of the plug 310 against the rear surface 303 of the second rear element 302 of the tubular abutment member 300. At the same time, as particularly shown in FIG. 5b, the font part 315 of the stem-like portion 311 of the plug 310 projects over the tubular abutment member 300.

Upon the movement of the end 22 from the working position to the rest position, the end cylinder 21 comes at first in contact with the font part 315 of the stem-like portion 311 of the plug 310 and subsequently in contact with the tubular abutment member 300, in such a manner to reciprocally separate the enlarged portion 302 therefrom and put in selective fluidic communication the variable volume compartment 18' and the outside environment through one or more apertures 12' in the end cap 12 via the tubular interspace 304.

In order to ensure that the end cylinder 21 comes always in contact with the tubular abutment member 300, at least one of the latter includes at least one magnetic portion and the other one includes at least one ferromagnetic portion, or both the end cylinder 21 and the tubular abutment member 300 include at least one magnetic portion.

In this manner, the end cylinder 21 and the tubular abutment member 300 reciprocally attract once one is close to the other, e.g., once the end cylinder 21 comes in contact with the font part 315 of the stem-like portion 311 of the plug 310.

For example, in the embodiment shown in the FIGS. 4a to 5b the first front element 301 and the rear part 21' of the end cylinder 21 are permanent magnets, so as to attract to each other.

Figure 6:
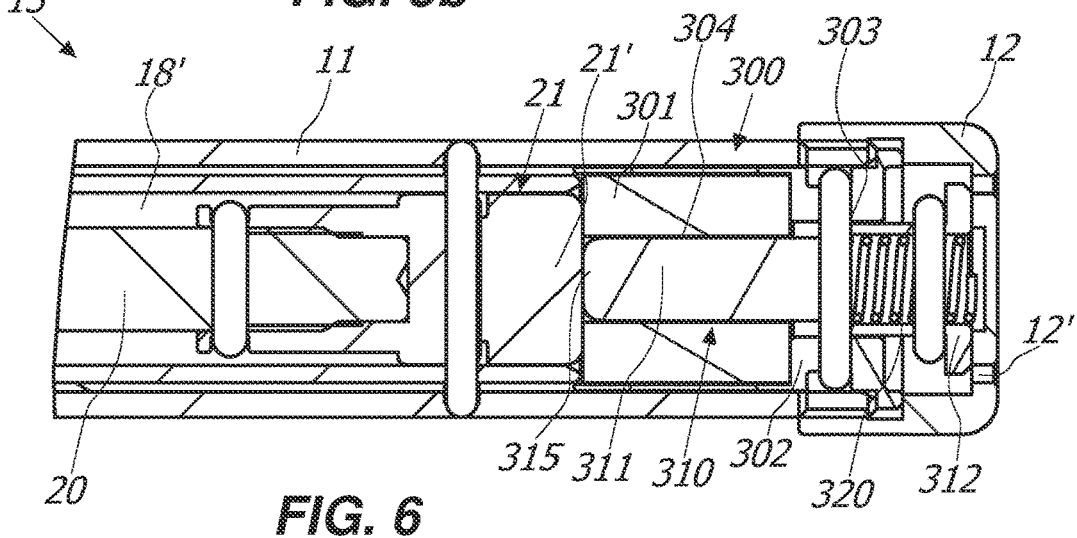
FIG. 6 is a view in section of the end 13' of the tubular element 11 of another embodiment of the linear actuator 1.

On the other side, in the embodiment shown in the FIG. 6 the first front element 301 is a permanent magnet, whereas the end cylinder 21 is made of a ferromagnetic material, i.e., iron or steel.

It is understood that the above embodiments are mere illustrative and non-limitative examples. It is conceivable that e.g., only part of the end cylinder 21 and/or the tubular abutment member 300 are magnets, whether permanent or not, or are made of ferromagnetic material.

Advantageously, the valve plug 310, the one or more magnetic portions 21', 300 and the elastic member 320 are reciprocally configured in such a manner that when the end cylinder 21 and the abutment member 300 are one close to the other, e.g. once the end cylinder 21 comes in contact with the font part 315 of the stem-like portion 311 of the plug 310, the magnetic force of the one or more magnetic portions 21', 300 overcomes the elastic force of the elastic member 320.

Thanks to the above configuration, it is ensured that once the end cylinder 21 and the tubular abutment member 300 are one close to the other, e.g., when the end cylinder 21 contacts the font part 315 of the stem-like portion 311 of the plug 310, they come always in contact irrespective of possible air entrapped in the variable volume compartment 18'.

In fact, despite all possible attention in manufacturing the linear actuator 1, it is practically not possible to ensure that even very small quantity of ambient air leaks through the various parts thereof.

This means that over time a certain quantity of undesired ambient air is present in the variable volume compartment 18'. However, as already mentioned in order to proper work this compartment must be under vacuum, i.e., at a pressure of substantially zero.

Clearly, the undesired ambient air which penetrates in the variable volume compartment 18' negatively influences the proper movement of the linear actuator, which tend to stop over time.

The above arrangement, which is practically a non-return valve system, avoids this problem: at each cycle, i.e., each time that the end 22 reaches the rest position, the end cylinder 21 comes in contact with the tubular abutment member 300 and acts on the plug 310, which is practically a valve plug, to move it away from the surface 303, which is practically a valve seat.

In this manner, the possible undesired air entrapped within the variable volume compartment 18' between the end cylinder 21 and the tubular abutment member 300 will be discharged towards the outside environment via the tubular interspace 304 and the one or more apertures 12'.

Thanks to the above arrangement, at each stroke the pressure in the variable volume compartment 18' is always put to substantially zero, i.e., it is substantially under vacuum. This ensures a proper work of the linear actuator over time, as well as long duration thereof.

Apart the materials of the one or more magnetic portions 21', 300 or the related ferromagnetic portions, the other parts may be made of any material.

However, it is advantageous that the plug 310 and the second rear element 302 are not made of magnetic or ferromagnetic material, e.g., brass or aluminum. In fact, these parts are in contact with the outside environment, and in case they are made of magnetic or ferromagnetic material they may attract powder or dust material inside the linear actuator.

Moreover, for the same reason it is advantageous that the second rear element 302 completely encompasses the front element 301.

For the same reason, it is advantageous that the end cap 12 is not made of magnetic or ferromagnetic material.

Advantageously, the compartment 18" may be fluidically communicating with the outside environment. In this way, the compartment 18" may be at atmospheric pressure, that is at the pressure of the outside environment.

For the above, in the closed position of the door shown in FIG. 1a the end cylinder 21 remains against the bottom wall 16 of the end cap 12, and therefore the end 22 remains in the rest position proximal to the jacket 10.

Once a user opens the sliding door D, i.e., upon the passage of the end 22 from the rest position proximal to the jacket 10 to the working position distal therefrom, the compartment 18' expands increasing in volume up to a maximum volume, while the compartment 18" contracts decreasing in volume up to a minimum volume.

In doing so, the user works against the vacuum present in the compartment 18', which guarantees that the same force will always be required to open the sliding door D regardless of its position. At the same time, the compartment 18" discharges the air present therein into the outside environment.

Once the user leaves the door D in the open position, the vacuum present in the compartment 18' will suck the rod 20 automatically recalling the end 22 towards the rest position proximal to the jacket 10, returning the end cylinder 21 against the end cap 12 and automatically closing the sliding door D. As a consequence, the compartment 18" will be charged with air coming from the outside environment.

Due to the fact that the compartment 18' is considered empty, the linear actuator 1 guarantees the constancy of the force required to open/close the door D from its position.

It is also evident that the linear actuator 1 is extremely functional and it's simple and economical to build and assemble.

In fact the assembly will take place as described above by inserting the rod 20 through the tubular element 11, inserting the above described valve arrangement and screwing the end cap 12 at the end 13' of the latter as mentioned above to obtain an under vacuum compartment 18', and screwing the closing element 14 in correspondence of the opposite end 13" after insertion of the same on the end 22 of the rod 20 through the opening 15.

Since the construction parts are minimal, like those in reciprocal movement, the linear actuator will require minimal maintenance and will guarantee a long service life.

The dimensions of the linear actuator 1 are minimal, making it suitable for any application, for example to move sliding doors or sliding door leaves, as better described below.

The simplicity of the linear actuator 1 will always guarantee the automatic closing/opening of the door or leaf from the open/closed position.

In a preferred but not exclusive embodiment of the invention, the closure element 14 may include means for controlling the air flow flowing in/out from the variable volume compartment 18", so as to control the force necessary to open the sliding door D and the closing speed thereof.

It is understood that the control means may also be configured only for one of the functions mentioned above, and in particular for controlling the force necessary for the passage of the cylindrical element 21 from the rest position to the working position or to control the speed of aspiration of the same towards the closed position, without thereby exceeding the scope of protection of the appended claims.

For this purpose, in general, a first and second line for the fluidic connection of the variable volume compartment 18" with the outside environment and valve means acting on them may be provided.

In the embodiment illustrated in FIGS. 1 to 3, a first fluid connecting line can be defined by a portion of the passing-through opening 15 and by the duct 19', 19".

In this fluid connecting line upon the passage of the end cylinder 21 from the rest position to the working position, the air present in the compartment 18" will pass through the passing-through opening 15, entering the duct 19 through the opening 19" and going out through the exit 19'. It is evident that upon the aspiration of the end cylinder 21 from the working position to the rest position, the air will make the reverse passage, entering through the opening 19' to reach the expanding compartment 18".

On the other hand, the second fluid connecting line may be defined by the opening 15, by the seat 26 and by the annular gap 27 between the stop ring 25 and the rod 20.

In this fluid connecting line upon the passage of the end cylinder 21 from the rest position to the working position, the air present in the compartment 18" will reach the exit 27 upon the passage through the passing-through 15 and the seat 26, while upon the aspiration of the end cylinder 21 from the working position to the rest position, the air will do the reverse passage, entering through the annular gap 27 to reach the expanding compartment 18".

The valve means may be defined by the seat 26 which will act as a valve seat for the axial movement of the elastomeric membrane 24, which will act as a plug for the passing-through 15 upon the aspiration of the end cylinder 21 from the working position to the rest position and will rest against the stop ring 25 upon the passage of the end cylinder 21 from the rest position to the working position, in any case allowing the passage of the air.

In other words, during the opening of the sliding door D, the air present in the contracting compartment 18" will be free to pass both through the duct 19 and through the annular gap 27, while during the closing of the sliding door D the air will pass exclusively through the duct 19 to reach the expanding compartment 18".

By suitably dimensioning the above parts it will be possible to control both the force required to open the sliding door D and the closing speed thereof. In particular, the force required to open the sliding door D may be determined by the diameter of the end cylinder 21.

In order to adjust the latter, suitable adjustment means may be provided, for example an adjustment grain 30, for adjusting the passage section. In this way, it will be possible to adjust the inflow of air entering the duct 19 through the opening 19' upon the aspiration of the end cylinder 21 from the working position to the rest position, thus regulating the returning speed to the closed position of the sliding door D.

For this purpose, the adjusting screw 30 may have a control end 31' accessible from the outside by an operator and a working end 31" acting in the duct 19.

It is understood that the control means described above can be applied to any linear actuator, preferably of pneumatic type, without thereby departing from the scope of protection of the appended claims.

For example, the control means referred to above may be applied to a gas spring of a known type, or a gas spring of a known type may include these control means.

In a further embodiment of the linear actuator 1, illustrated for example in FIGS. 6 and 7, the rest position of the end 22 may correspond to the distal position from the jacket 10 thereof, as illustrated for example in FIG. 6, while the working position of the end 22 may correspond to the position proximal to the jacket 10 thereof, as illustrated for example in FIG. 7.

In this embodiment, the compartment 18" may be fluidically insulated and vacuum, while the compartment 18' can be in fluid connection with the outside environment to remain at atmospheric pressure.

For this purpose, when the end 22 is in the rest position, the end cylinder 21 of the rod 20 may be abutting against the closing element 14, and in particular against a stop wall 14' of the same, whereas when the end 22 is in the working position the end cylinder 21 of the rod 20 may remain spaced from the bottom wall 16 of the end cap 12 to free the passage opening 19" of the duct 19.

In this way, when the end 22 is in the rest position, the volume and the pressure of the compartment 18" are substantially zero.

This embodiment will work as opposed to that shown in FIGS. 1b to 5 and will therefore work in compression rather than in traction.

Once a user compresses the rod 20 from the extended rest position towards the retracted work position, in fact, the compartment 18" will suck the same rod bringing it back into the rest position.

From what has been described above, it is clear that the invention fulfils the intended objects. The term "substantially" indicates the stated nominal value with a possible deviation up to the next two integer numbers; for example, "substantially zero" will indicate a range from zero to 2%.

The invention is susceptible of numerous modifications and variations, all within the inventive concept expressed in the appended claims. All the details may be replaced by other technically equivalent elements, and the materials may be different according to needs, without departing from the scope of the invention.

Although the invention has been described with particular reference to the accompanying figures, the reference numbers used in the description and claims are used to improve the intelligence of the invention and do not constitute any limitation to the claimed scope of protection.

What is claimed is:

1. A linear actuator for moving a closing element, comprising:
   a jacket defining an axis, said jacket including a first and a second opposite ends; and
   a rod having an end cylinder slidable in a reciprocal relation with said jacket along said axis between a rest position and a working position,
   wherein said end cylinder is inserted within said jacket so as to divide said jacket into a first and a second variable volume compartments fluidly independent of each other,
   wherein one of the first or the second variable volume compartments is fluidically insulated and under vacuum, the other one of the first or the second variable volume compartments being fluidly communicating with an outside environment through one of the first or the second opposite ends to suck or discharge ambient air from or toward the outside environment,
   wherein, upon a passage of said end cylinder from said rest position to said working position, said one of said first or said second variable volume compartments expands, causing said rod to be sucked and said end cylinder to return from the working position to the rest position,
   wherein the other one of the first or the second opposite ends includes an abutment member, said end cylinder in said rest position being in contact with said abutment member, and
   wherein said abutment member includes a non-return valve mechanism adapted to put selectively into fluid contact said one of the first or the second variable volume compartments with an outside environment upon contact with said end cylinder, so as to discharge possible undesired ambient air entrapped between said end cylinder and said abutment member.

2. The actuator according to claim 1, wherein said non-return valve mechanism automatically closes upon a separation between said end cylinder and said abutment member and automatically opens upon contact thereof.

3. The actuator according to claim 1, wherein said valve mechanism includes a valve plug, said abutment member including a valve seat for the valve plug, the valve mechanism enclosing an elastic member acting on the valve plug to force the valve plug against the valve seat upon a separation between the end cylinder and the abutment member, the end cylinder, upon contact with the abutment member, acting on the valve plug for separating the valve plug from the valve seat.

4. The actuator according to claim 3, wherein the other one of the first or the second opposite ends includes an end cap having an aperture that puts said valve seat and the outside environment in fluid communication, the elastic member being interposed between the valve plug and the end cap.

5. The actuator according to claim 3, wherein at least one of said end cylinder or said abutment member includes a magnetic portion, the other one of said end cylinder or said abutment member including a ferromagnetic portion or another magnetic portion so as to reciprocally attract when one approaches the other.

6. The actuator according to claim 5, wherein said valve plug, said magnetic portion and said elastic member are reciprocally configured so that, when said end cylinder and said abutment member are approaching each other, a magnetic force of said magnetic portion overcomes an elastic force of said elastic member.

7. The actuator according to claim 5, wherein said abutment member includes a front portion faced to said end cylinder and a rear portion, said front portion including said magnetic portion, said rear portion and said valve plug being not made of a magnetic or ferromagnetic material in order to avoid attraction of powder or dust material from the outside environment.

8. The actuator according to claim 3, wherein the abutment member has a tubular shape, said valve plug having a stem-shaped portion to be coaxially inserted within said abutment member and an enlarged portion adapted to act against said valve seat, a first length of said valve plug being greater than a second length of said abutment member so that, when said enlarged portion is forced against said valve plug, a part of said stem-shaped portion projects over said abutment member to come in contact with said end cylinder, said end cylinder coming subsequently in contact with said abutment member and causing said valve seat and said enlarged portion to reciprocally separate.

9. The actuator according to claim 8, wherein said stem-shaped portion is inserted with a clearance within said abutment member, so as to allow a selective passage of the ambient air that may be entrapped.

10. The actuator according to claim 1, wherein a minimum volume of said one of said first or said second variable volume compartments is substantially zero.

11. The actuator according to claim 1, wherein a pressure within said one of said first or said second variable volume compartments is substantially zero.

12. The actuator according to claim 1, wherein said rod further includes a second end opposite to said end cylinder and externally slidable with respect to said jacket along said axis between a position proximal to said jacket and corresponding to one of the rest or the working positions of said end cylinder, and a position distal therefrom and corresponding to the other one of the rest or working positions of said end cylinder.

13. The actuator according to claim 12, wherein said one of the first or the second opposite ends includes a pass-through opening for passage of said rod, said one of said first or said second variable volume compartments including said other one of the first or the second opposite ends, a proximal position of the second end of said rod corresponding to the rest position of said end cylinder.

14. The actuator according to claim 1, wherein, upon the passage of said end cylinder from said rest position to said working position, said other of said first or said second variable volume compartments retracts by blowing off air toward the outside environment, and, upon sucking of said end cylinder from said working position to said rest position, the other one of said first or said second variable volume compartments expands by sucking the air from the outside environment.

15. The actuator according to claim 1, further comprising a control system that controls an air flow flowing in or out from said other one of said first or said second variable volume compartments to control a force necessary for the passage of said end cylinder from said rest position to said working position and/or a suction speed thereof from said working position to said rest position.

16. The actuator according to claim 15, wherein said control system includes:
 a first and a second fluid connecting line for fluid connection of said other one of said first and said second variable volume compartments with the outside environment; and
 a valve selectively acting on one of said first or said second fluid connecting lines to open said first or said second fluid connecting lines upon the passage of said end cylinder from said rest position to said working position and to close said first or said second fluid connecting lines upon a reverse passage, so as to force the air to flow in said other one of said first or said second variable volume compartments through the other one of said first or said second fluid connecting lines.

17. The actuator according to claim 16, wherein said control system include an adjusting device acting on said other one of said first or said second fluid connecting lines to adjust a flow passage section.

18. The actuator according to claim 17, wherein said other one of said first or said second fluid connecting lines includes a duct, said adjusting device including an adjusting screw having an operating end accessible from outside by an operator and a working end acting on said duct.

19. The actuator according to claim 1, wherein said rod comprises a second end opposite to said end cylinder and external to said jacket and reciprocally slidable unitarily with said end cylinder between a position proximal to said jacket, corresponding to said rest position, and a distal position therefrom, corresponding to the working position, a suction of said end cylinder recalling said second end from the distal to the proximal position.

20. A system for automatically closing or opening an aperture, comprising:
 a closing element movable between a closed position, wherein said aperture is closed, and an open position, wherein said aperture is open; and
 a moving system adapted to move said closing element, wherein said moving system comprises a linear actuator according to claim 1.

* * * * *